US009600025B2

(12) United States Patent
Lee et al.

(10) Patent No.: US 9,600,025 B2
(45) Date of Patent: Mar. 21, 2017

(54) TOUCH PANEL AND MANUFACTURING METHOD THEREOF

(71) Applicant: LG INNOTEK CO., LTD., Seoul (KR)

(72) Inventors: Dong Keon Lee, Seoul (KR); Ja Ram Kim, Seoul (KR); Jae Hong Lee, Seoul (KR); Jong Sun Kim, Seoul (KR); Bum Sun Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/428,090

(22) PCT Filed: Jul. 3, 2013

(86) PCT No.: PCT/KR2013/005911
§ 371 (c)(1),
(2) Date: Mar. 13, 2015

(87) PCT Pub. No.: WO2014/051247
PCT Pub. Date: Apr. 3, 2014

(65) Prior Publication Data
US 2015/0277483 A1  Oct. 1, 2015

(30) Foreign Application Priority Data
Sep. 27, 2012  (KR) .......................  10-2012-0108094

(51) Int. Cl.
G06F 1/16  (2006.01)
G06F 3/044  (2006.01)

(52) U.S. Cl.
CPC ................ *G06F 1/16* (2013.01); *G06F 3/044* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

2009/0242283 A1    10/2009  Chiu
2010/0261119 A1*   10/2010  Li ........................... G06F 3/044
                                                                430/319

(Continued)

FOREIGN PATENT DOCUMENTS

| CN | 101859213 | 10/2010 |
| CN | 102622145 | 8/2012 |
| KR | 10-2011-0095684 A | 8/2011 |

OTHER PUBLICATIONS

International Search Report dated Oct. 29, 2013 issued in Application No. PCT/KR2013/005911 (full English text).

(Continued)

*Primary Examiner* — Kenneth B Lee, Jr.
(74) *Attorney, Agent, or Firm* — KED & Associates, LLP

(57) ABSTRACT

Disclosed is a touch panel. The touch panel includes a plurality of sensing electrode patterns spaced apart from each other on a substrate; and a bridge electrically connecting the sensing electrode patterns to each other, wherein an end portion of the bridge is perpendicular to a surface of the substrate or is inclined within a predetermined angle with respect to a perpendicular line of the surface of the substrate.

18 Claims, 4 Drawing Sheets

(56) References Cited

U.S. PATENT DOCUMENTS

2012/0044191 A1* 2/2012 Shin .................. G06F 3/044
                                                       345/174
2012/0056664 A1    3/2012 Nam
2012/0193210 A1    8/2012 Yau et al.

OTHER PUBLICATIONS

Chinese Office Action dated Jan. 24, 2017 issued in Application No. 201380050021.8 (with English translation).

* cited by examiner

TOUCH PANEL AND MANUFACTURING METHOD THEREOF

CROSS-REFERENCE TO RELATED PATENT APPLICATIONS

This application is a U.S. National Stage Application under 35 U.S.C. 5371 of PCT Application No. PCT/KR2013/005911, filed Jul. 3, 2013, which claims priority to Korean Patent Application No. 10-2012-0108094, filed Sep. 27, 2012, whose entire disclosures are hereby incorporated by reference.

TECHNICAL FIELD

The embodiment relates to a touch panel. More particularly, the embodiment relates to a touch panel having improved visibility.

BACKGROUND ART

A touch panel including an input unit (pointing device) has been extensively used in displays of electronic devices such as personal digital assistants (PDA), a notebook computer, office automation (OA) device, a medical device, or an automobile navigation system. For example, a capacitive type touch panel is generally known in the art as well as a resistive type touch panel, an electromagnetic induction type touch panel, and an optical type touch panel.

In general, the capacitive type touch panel is classified into an analog type and a digital type.

Since the analog type touch panel includes a sheet type sensor electrode, a pattern is not required on a sensing region. However, the digital type touch panel requires a pattern for a sensor electrode in the sensing region. The digital type capacitive touch panel induces a current to confirm a touch location based on variation in capacitance caused by electrostatics of a human body and a transparent electrode. For example, in order to detect a location in the touch panel touched by a finger or a stylus, various technologies for the capacitive type touch panel have been developed.

For example, a lattice touch-sensing system for detecting a position of a touch on a touch-sensitive surface is disclosed in U.S. Pat. No. 6,970,160. The lattice touch-sensing system may include two capacitive sensing layers separated by an insulating material where each layer consists of substantially parallel conducting elements, and the conducting elements of the two sensing layers are substantially orthogonal to each other. Each element may be prepared as a series of diamond shaped patches that are connected together with narrow conductive rectangular strips. Each conducting element of a given sensing layer is electrically connected at one or both end portions thereof to a lead line of a corresponding set of lead lines. A control circuit may also be included to provide an excitation signal to both sets of conducting elements through the corresponding sets of lead lines to receive sensing signals generated by sensor elements when a touch on the surface occurs, and to determine a position of the touch based on the position of the affected bars in each layer.

The capacitive type touch panel generally includes two capacitive sensing layers. The two capacitive sensing layers are spaced apart from each other while interposing an insulation material therebetween in order to generate a capacitive effect between the two layers. Such a structure significantly increases a thickness of a structure of a panel which results in adversary effect on the miniaturization.

Further, the capacitive type touch panel according to the related art includes a substrate on both surfaces thereof on which the two capacitive sensing layers are formed, respectively. Therefore, through holes must be formed in the substrate to serve as vias and circuit layering must be adopted in order to suitably connect conductor elements of the sensing layers to each other. Thus, the manufacture of the capacitive type touch panel may become difficult and complicated.

Accordingly, in order to solve the above problem, a scheme of reducing two capacitive sensing layers to one capacitive sensing layer has been used. Recently, a scheme of configuring sensing layers (sensing electrode pattern layer) as one layer and connecting the sensing layers to each other through a metal bridge has been used.

FIGS. 1 and 2 are sectional views illustrating a touch panel according to the related art, which shows a section of a metal bridge of the touch panel for connecting the sensing layers (sensing electrode layers) to each other.

The touch panel according to the related art will be described with reference to FIGS. 1 and 2.

As shown in FIG. 1, a metallic or non-metallic material 140 for forming a metal bridge is formed on a transparent window 110, and a photoresist 155 is formed on the metallic or non-metallic material 140 to etch the metallic or non-metallic material 140.

Next, as shown in FIG. 2, the metal bridge 150 is formed through an etch process.

In this manner, if the metallic or non-metallic material 140 is etched, since the end portion of the metal bridge 150 generally has no vertical structure, the metal bridge 150 has a trapezoidal shape, a reversed trapezoidal shape, a concave shape, or a convex shape. The above shape may be caused due to under cut when the material 140 has a single layered structure and due to a difference in etching rate between metals forming respective layers when the material 140 has a multi-layered structure.

According to the related art, since step difference L occurs in an end portion of the metal bridge 150 so that an angle between the end portion of the metal bridge 150 and a transparent window reaches at least 70°, external light is reflected by the metal bridge 150 so that the visibility of the touch panel is degraded.

DISCLOSURE

Technical Problem

The embodiment provides a touch panel, in which an end portion of a metal bridge electrically connecting sensing electrode patterns to each other is perpendicular to a surface of a substrate or inclined within a predetermined angle with respect to a perpendicular line of the surface of the substrate so that external light is not reflected from the end portion of the metal bridge, thereby improving the visibility of the touch panel.

Technical Solution

According to the embodiment, there is provided a touch panel including: a plurality of sensing electrode patterns spaced apart from each other on a substrate; and a bridge electrically connecting the sensing electrode patterns to each other, wherein an end portion of the bridge is perpendicular to a surface of the substrate or is inclined within a predetermined angle with respect to a perpendicular line of the surface of the substrate.

According to another embodiment, the bridge may include a first end portion inclined at a first angle with respect to the surface of the substrate, and a second end portion inclined at a second angle with respect to the surface of the substrate.

According to another embodiment, a ratio of a length of a first surface facing the substrate to a length of a second surface opposite to the first surface in the bridge may be in a range of about 1:1 to about 1:1.2.

According to another embodiment, the predetermined angle may be in a range of about 0° to about 35°.

According to another embodiment, the bridge may include a plurality of metal layers.

According to another embodiment, the metal layers may include an electrode layer and a light absorption layer.

According to another embodiment, the bridge may be formed on one surface of the substrate, and the sensing electrode patterns are formed on a top surface of the bridge.

According to another embodiment, the sensing electrode patterns may be formed on one surface of the substrate, and the bridge is formed on top surfaces of the sensing electrode patterns.

According to another embodiment, a top surface of the bridge based on the substrate has a circular shape, an elliptical shape or line shape.

According to the embodiment, there is provided a method of manufacturing a touch panel, the method including: preparing a substrate; coating photoresist layers on the substrate at a predetermined interval; coating metal layers on top surfaces of the photoresist layers and between the photoresist layers, respectively; and forming a bridge by removing the photoresist layers.

According to another embodiment, an end portion of the bridge may be perpendicular to a surface of the substrate or be inclined within a predetermined angle with respect to a vertical line of the surface of the substrate.

According to another embodiment, the predetermined angle may be in a range of about 0° to about 35°.

According to another embodiment, the method may further include forming a plurality of sensing electrode patterns spaced apart from each other on the substrate after the preparing of the substrate, wherein the bridge is formed on top surfaces of the sensing electrode patterns.

According to another embodiment, the method may further include forming a plurality of sensing electrode patterns on a top surface of the bridge after the forming of the bridge.

Advantageous Effects

According to the embodiment, an end portion of a metal bridge electrically connecting sensing electrode patterns to each other is perpendicular to a surface of a substrate or inclined within a predetermined angle with respect to a perpendicular line of the surface of the substrate so that external light is not reflected from the end portion of the metal bridge, thereby improving the visibility of the touch panel.

MODE FOR INVENTION

Figure 1:
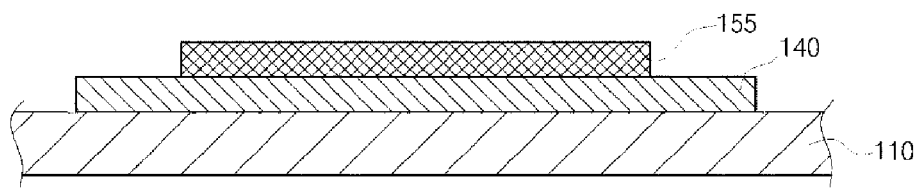
FIGS. 1 and 2 are sectional views illustrating a touch panel according to the related art.
Figure 2:
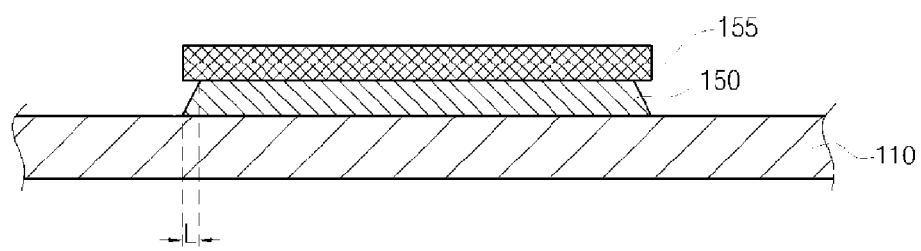

Hereinafter, a touch panel according to the exemplary embodiment will be described in detail with reference to accompanying drawings. In a description of the embodiment, if the function or the structure related to the disclosure and generally known to those skilled in the art make the subject matter of the disclosure unclear, the details of the function or the structure will be omitted. The size of the elements shown in the drawings may be exaggerated for the purpose of explanation and may not utterly reflect the actual size.

FIGS. 3 to 9 are sectional views illustrating a touch panel according to an embodiment.

The touch panel according to the embodiment will be described with reference to FIGS. 3 to 9.

Figure 3:
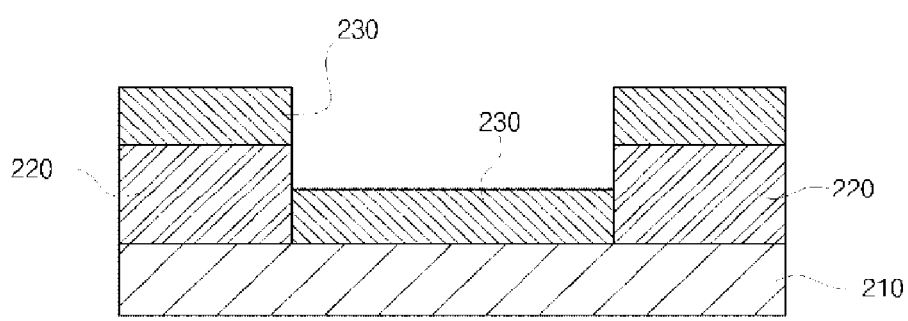
FIGS. 3 to 9 are sectional views illustrating a touch panel according to an embodiment.

According to the embodiment, as shown in FIG. 3, a photoresist 220 is formed on a substrate 210, and a metallic material layer 230 is formed by coating a metallic material. In this case, the metallic material layer 230 may be formed in a single layer or a multi-layer using a plurality of materials. Meanwhile, the substrate 210 may include one of PET (polyethylene terephthalate resin), PC (polycarbonate), PMMA (polymethyl methacrylate), TAC (triacetate cellulose), glass and PES (polyether sulfone).

Figure 4:
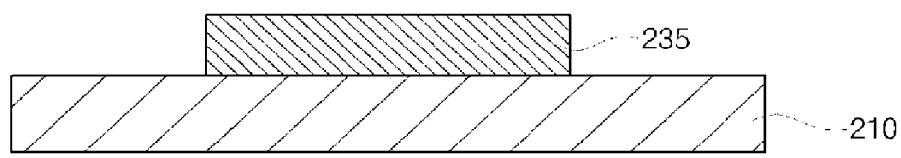
Figure 5:
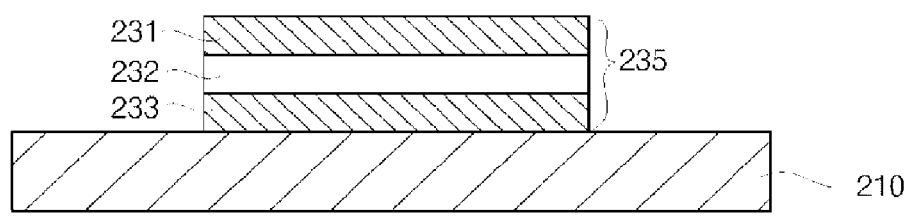

Next, a bridge is formed as illustrated in FIG. 4 by removing the photoresist 220. The bridge may include a metal bridge 235. In this case, when the metallic material layer 230 is configured in the multi-layer, as shown in FIG. 5, the metal bridge 235 is configured by a plurality of metal layers. For example, when the metal bridge 235 is formed in three layers, as shown in FIG. 5, a first metal layer, a second metal layer, and a third metal layer of the metal bridge 235 may serve as a light absorption layer 231, an electrode layer 232, and a light absorption layer 233, respectively.

As shown in FIGS. 3 to 5, if the metal bridge is formed by forming and removing the photoresist 220, an end portion of the metal bridge 235 is formed substantially perpendicular to a surface of the substrate 210.

Figure 6:
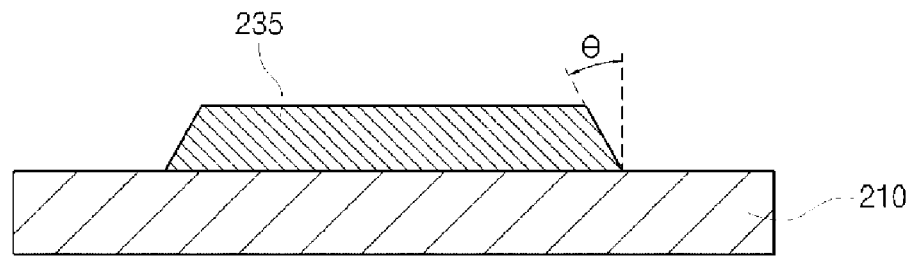

That is, as shown in FIG. 6, the end portion of the metal bridge 235 is perpendicular to the surface of the substrate 210 or is inclined at a predetermined angle θ approximately perpendicular to the surface of the substrate 210.

Figure 7:
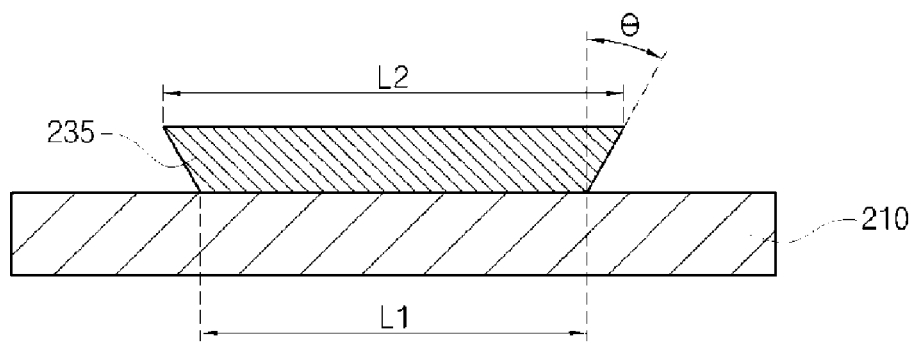
Figure 8:
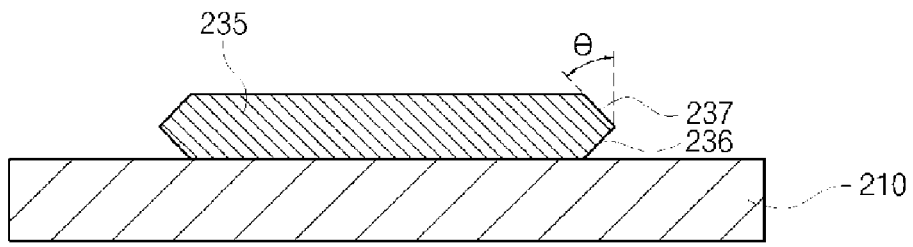

For example, as shown in FIGS. 6 to 8, the end portion of the metal bridge 235 is inclined at a predetermined angle θ with respect to a perpendicular line of the surface of the substrate 210.

In this case, the metal bridge 235 is inclined at an angle being the range of 0° to 35°. When the inclined angle of the metal bridge 235 is beyond the angle range, external light is reflected by the end portion of the metal bridge 235 so that the metal bridge is visually recognized at a user' eyes. When the inclined angle of the metal bridge 235 is included within the angle range, external light is not reflected by an end portion of the metal bridge 235 so that the visibility of the touch panel is improved.

If the angle is less than 0°, it may occur reflection at the end portion of the metal bridge 235. If the angle is exceed 35°, sensing electrode patterns may crumble.

Further, according to another embodiment, the ratio of the length of a first surface to the length of a second surface on the metal bridge 235 may be within a predetermined range.

That is, as shown in FIG. 7, if a surface of the metal bridge 235 facing a substrate 210 is defined as a first surface and a surface opposite to the first surface is defined as a second surface, the ratio of the length L1 of the first surface to the length L2 of the second surface may be in the range of 1:1 to 1:1.2. In this manner, if the ratio of the length L1 of the first surface to the length L2 of the second surface is within the constant range, the end portion of the metal bridge 235 is approximately perpendicular to the surface of the substrate 210 so that the metal bridge 235 does not reflect external light.

Figure 9:
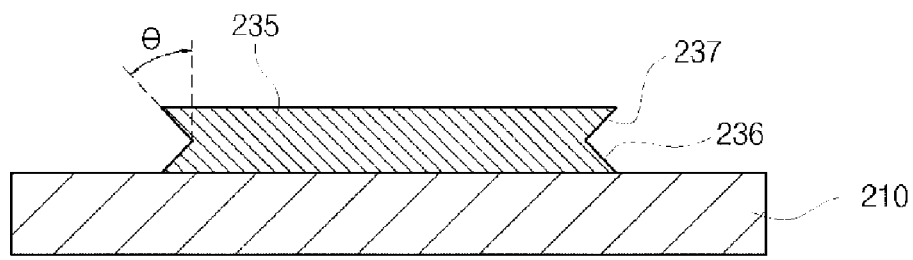

In addition, since a plurality of metallic materials have different etch rates when the metal bridge 235 is formed in a multi-layer using the metallic materials, as illustrated in FIG. 8 or 9, the end portion of the metal bridge 235 is inclined at different angles θ with respect to the surface of the substrate 210. In this case, the angle θ has the range of 0° to 35°.

That is, the end portion of the metal bridge 235 may include a first end portion 236 inclined at a first angle and a second end portion 237 inclined at a second angle.

In this manner, if the first end portion 236 and the second end portion 237 are perpendicular to the surface of the substrate 210 or are inclined at a predetermined angle with respect to the perpendicular line of the surface of the substrate 210, the metal bridge 235 does not reflect external light.

Figure 10:
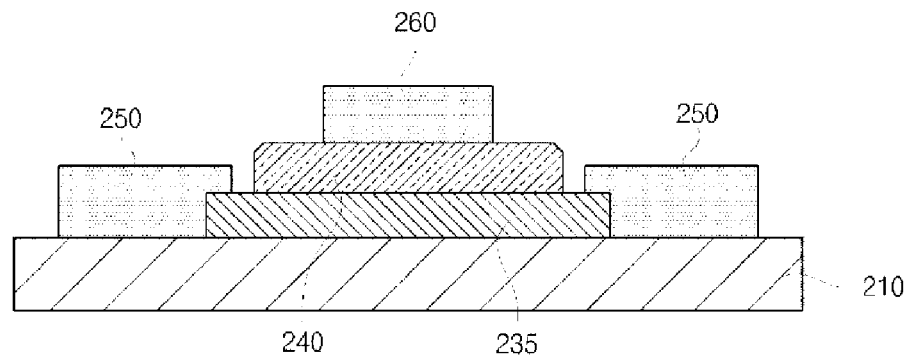
FIG. 10 is a sectional view illustrating a touch panel according to the embodiment.

FIG. 10 is a sectional view illustrating a touch panel according to the embodiment.

According to the embodiment, as shown in FIG. 10, after the metal bridge 235 and a first sensing electrode pattern 250 have been formed, an insulator 240 and a second sensing electrode pattern 260 are formed on the metal bridge 235, so that the touch panel is manufactured.

Meanwhile, the first and second sensing electrode patterns 250 and 260 include one of an ITO (Indium Tin Oxide), an IZO (Indium Zinc Oxide), a ZnO (Zinc Oxide), a CNT (carbon nano tube), an Ag Nano wire, and a conductive polymer, and a graphene.

Figure 11:
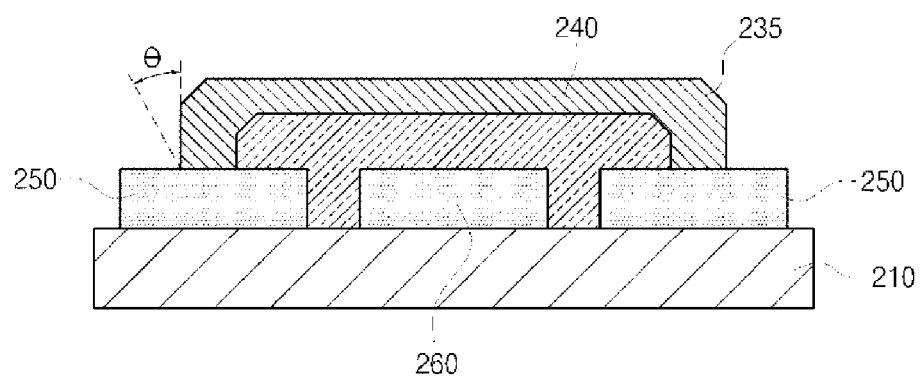
FIG. 11 is a sectional view illustrating a touch panel according to another embodiment.

FIG. 11 is a sectional view illustrating a touch panel according to another embodiment. FIG. 11 illustrates an example of a touch panel configured by forming a sensing electrode pattern on a substrate and forming a metal bridge on the sensing electrode pattern.

As shown in FIG. 11, in the touch panel according to another embodiment, sensing electrode patterns 250 and 260 are formed on a substrate 210 and an insulator 240 is formed on the sensing electrode patterns 250 and 260.

A metal bridge 235 is formed on the insulator 240. In this case, an end portion of the metal bridge 235 is perpendicular to a surface of the substrate 210 or is inclined at a predetermined angle θ with respect to the perpendicular line of the substrate 210.

Figure 12:
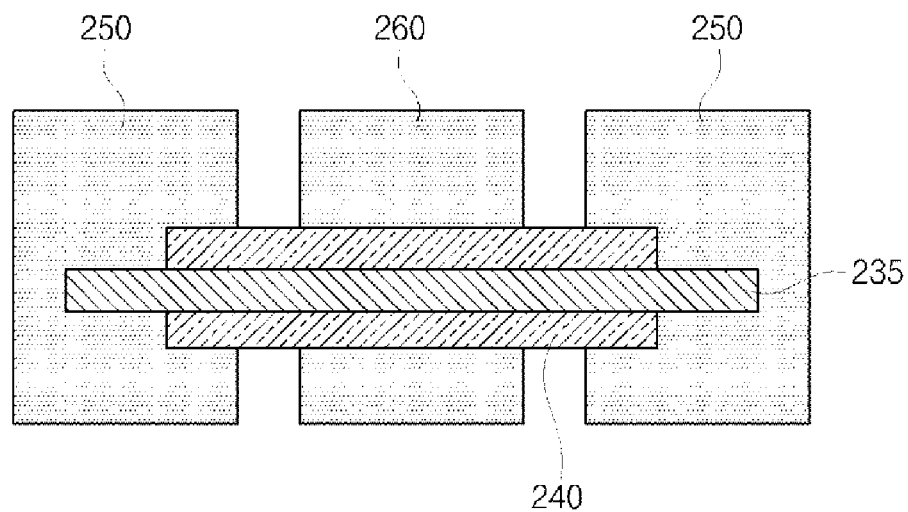
FIGS. 12 to 14 are top views illustrating a touch panel according to still another embodiment.
Figure 13:
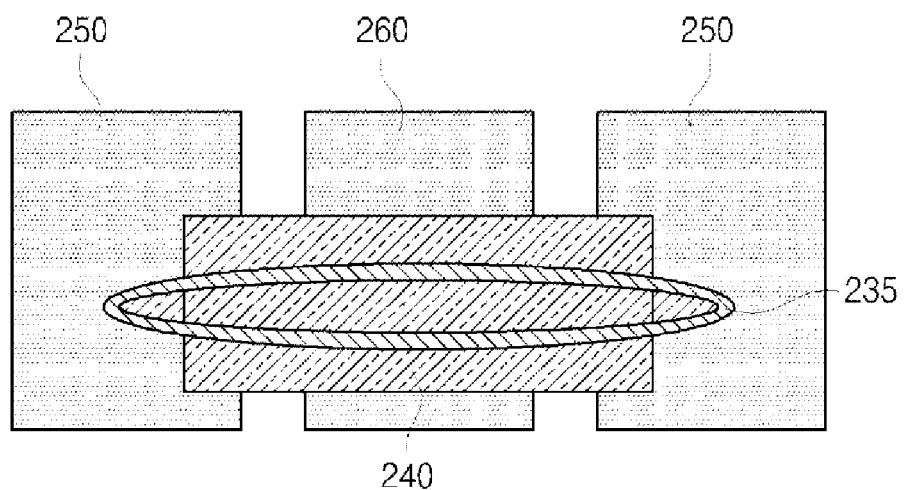
Figure 14:
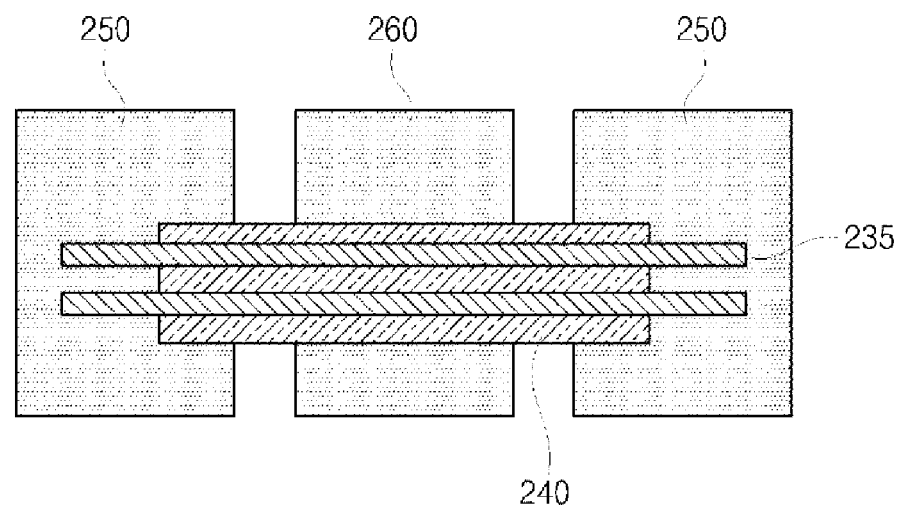

FIGS. 12 to 14 are top views illustrating a touch panel according to still another embodiment.

According to still another embodiment, when viewing the touch panel from the top, even if the metal bridge 235 is configured in a bar shape as shown in FIG. 12 or a hollow elliptical shape as shown in FIG. 13, or in line shape facing each other as shown in FIG. 14, the end portion of the metal bridge 235 may be perpendicular to a surface of the substrate or is inclined within a predetermined angle with respect to a perpendicular line of the substrate.

As shown in FIGS. 12 to 14, if the metal bridge 235 of the touch panel is perpendicular to the substrate or is inclined within a predetermined angle with respect to a perpendicular line of the substrate, external light is not reflected by the end portion of the metal bridge 235 so that the visibility of the touch panel can be improved.

Hereinafter, a method of manufacturing a touch panel according to the embodiment will be described with reference to FIGS. 3 and 4. A description of a method of manufacturing a touch panel is basically incorporated with the description of this touch panel.

The method of manufacturing a touch panel according to the embodiment includes preparing a substrate; coating photoresist layers on the substrate at a predetermined interval; coating metal layers on top surfaces of the photoresist layers and between the photoresist layers, respectively; and forming a metal bridge by removing the photoresist layers.

The photoresist layers are removed from the substrate by exposure, development, and etch processes. As the photoresist layers are removed, only the metal layers coated between the photoresist layers may remain so that the metal bridge is finally formed.

In this case, the end portion of the metal bridge is perpendicular to the surface of the substrate or is inclined within a predetermined angle with respect to a perpendicular line of the substrate. Preferably, the predetermined angle may be in the range of about 0° to about 35°.

Further, after the preparing the substrate, the method of manufacturing a touch panel may further include forming a plurality of sensing electrode patterns to be spaced apart from each other on the substrate. The metal bridge may be formed on top surfaces of the sensing electrode patterns.

In addition, in the another embodiment, after the forming the metal bridge, the method of manufacturing a touch panel may further include forming the sensing electrode patterns on the top surface of the metal bridge.

A touch panel manufactured by the method of manufacturing a touch panel may include a metal bridge having an end portion perpendicular to the substrate or inclined at a predetermined angle with respect to the substrate. Accordingly, since external light is not reflected by the end portion of the metal bridge 235, the visibility of the touch panel can be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch panel comprising:
    a plurality of sensing electrode patterns spaced apart from each other on a substrate; and
    a bridge electrically connecting the sensing electrode patterns to each other,
    wherein a ratio of a length of a first surface facing the substrate to a length of a second surface opposite to the first surface in the bridge is in a range of about 1:1 to about 1:1.2,
    wherein an end portion of the bridge is inclined with respect to the surface of the substrate,
    wherein an incline angle is in a range greater than 0° and not greater than 35°, and wherein the incline angle is an angle between a side surface formed between the first and second surfaces and an axis perpendicular to the surface of the substrate.

2. The touch panel of claim 1, wherein the bridge is formed on one surface of the substrate, and the sensing electrode patterns are formed on a top surface of the bridge.

3. The touch panel of claim 1, wherein the sensing electrode patterns are formed on one surface of the substrate, and the bridge is formed on top surfaces of the sensing electrode patterns.

4. The touch panel of claim 1, wherein a top surface of the bridge based on the substrate has a circular shape, an elliptical shape or line shape.

5. The touch panel of claim 1, wherein a plurality of sensing electrode patterns dispose on the same plane of the substrate.

6. A touch panel comprising
a plurality of sensing electrode patterns spaced apart from each other on a substrate; and
a bridge electrically connecting the sensing electrode patterns to each other,
wherein a ratio of a length of a first surface facing the substrate to a length of a second surface opposite to the first surface in the bridge is in a range of about 1:1 to about 1:1.2.

7. The touch panel of claim 6, wherein the bridge is formed on one surface of the substrate, and the sensing electrode patterns are formed on a top surface of the bridge.

8. The touch panel of claim 6, wherein the sensing electrode patterns are formed on one surface of the substrate, and the bridge is formed on top surfaces of the sensing electrode patterns.

9. The touch panel of claim 6, wherein a top surface of the bridge based on the substrate has a circular shape, an elliptical shape or line shape.

10. The touch panel of claim 6, wherein a plurality of sensing electrode patterns dispose on the same plane of the substrate.

11. A touch panel comprising:
a plurality of sensing electrode patterns spaced apart from each other on a substrate; and
a bridge electrically connecting the sensing electrode patterns to each other,
wherein a ratio of a length of a first surface facing the substrate to a length of a second surface opposite to the first surface in the bridge is in a range of about 1:1 to about 1:1.2,
wherein the bridge comprises a first end portion inclined at a first angle with respect to the surface of the substrate, and a second end portion inclined at a second angle with respect to the surface of the substrate, and
wherein the first angle and the second angle are an angle between a side surface formed between the first and second surfaces and an axis perpendicular to the surface of the substrate.

12. The touch panel of claim 11, wherein the first angle and the second angle are in a range greater than 0° and not greater than 35°.

13. The touch panel of claim 11, wherein the bridge comprises a plurality of metal layers.

14. The couch panel of claim 13, wherein the metal layers comprise an electrode layer and a light absorption layer.

15. The touch panel of claim 11, wherein the bridge is formed on one surface of the substrate, and the sensing electrode patterns are formed on a top surface of the bridge.

16. The touch panel of claim 11, wherein the sensing electrode patterns are formed on one surface of the substrate, and the bridge is formed on top surfaces of the sensing electrode patterns.

17. The touch panel of claim 11, wherein a top surface of the bridge based on the substrate has a circular shape, an elliptical shape or line shape.

18. The touch panel of claim 11, wherein a plurality of sensing electrode patterns dispose on the same plane of the substrate.

* * * * *